(12) United States Patent  (10) Patent No.: US 8,216,363 B2
Myerson et al.  (45) Date of Patent: Jul. 10, 2012

(54) CONTINUOUS ANTISOLVENT CRYSTALLIZATION PROCESS AND SYSTEM USING PLUG FLOW REACTORS

(75) Inventors: Allan S. Myerson, Chicago, IL (US); Alejandro Alvarez, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 926 days.

(21) Appl. No.: 12/258,869

(22) Filed: Oct. 27, 2008

(65) Prior Publication Data

US 2010/0105907 A1 Apr. 29, 2010

(51) Int. Cl.
 *C30B 29/54* (2006.01)
(52) U.S. Cl. ............... 117/68; 117/69; 117/70
(58) Field of Classification Search .......... 117/68, 117/69, 70
See application file for complete search history.

(56) References Cited

U.S. PATENT DOCUMENTS

| 4,138,247 | A | * | 2/1979 | Esdaile et al. ............ 75/587 |
| 6,645,293 | B2 | * | 11/2003 | Myerson ............ 117/68 |
| 7,329,592 | B2 | * | 2/2008 | Myerson et al. ............ 438/497 |
| 2004/0028582 | A1 | * | 2/2004 | Carpenter et al. ......... 422/245.1 |
| 2005/0256063 | A1 | * | 11/2005 | Li et al. ............ 514/28 |

* cited by examiner

*Primary Examiner* — Bob M Kunemund
(74) *Attorney, Agent, or Firm* — Laurence P. Colton; Smith Risley Tempel Santos LLC

(57) ABSTRACT

A process and system for continuous crystallization of a compound using antisolvent addition in which a solution is prepared with an organic compound and a solvent. An antisolvent is added to the solution in a continuous plug flow system comprising at least one process module. The antisolvent can be added in multiple addition points such that the overall amount of antisolvent added to the continuous plug flow reactor remains fixed. The multiple addition point technique provides every process module with an equal volume of antisolvent. Finally, crystals are recovered from the slurry upon exiting the system. Preferably, the mean crystal size is less than 100 μm.

30 Claims, 13 Drawing Sheets

CONTINUOUS ANTISOLVENT CRYSTALLIZATION PROCESS AND SYSTEM USING PLUG FLOW REACTORS

BACKGROUND OF THE INVENTION

1. Technical Field

This invention relates generally to a continuous antisolvent crystallization process for producing crystals with a narrow crystal size distribution, and relates more specifically to a continuous multistage plug flow crystallization system for the preparation of fine crystals of controlled size and crystal size distribution.

2. Background Art

Crystallization is one of the most widely used chemical processes in the world. Generally, crystallization is the process of forming solid crystals which precipitate from a solution or melt. More specifically, crystallization is comprised of two essential steps, nucleation and crystal growth. Crystallization from a solution begins with the nucleation of crystals followed by the growth of these nuclei to a finite size (i.e., crystal growth). Nucleation and growth follow separate kinetic regimes in which nucleation normally favors high driving forces (i.e., supersaturation) whereby growth favors low supersaturation. As the ratio of the rate of nucleation to growth during crystallization inevitably determines the crystal size distribution, higher supersaturation is preferred over lower supersaturation in order to produce smaller crystals. Attempts to produce crystals in the 1-5 µm range has led scholars to strive to produce methods that implement large supersaturations.

Previously known methods in the art for implementing large supersaturations are supercritical fluid crystallization, impinging jet crystallization, and spray drying. Each of the above-mentioned methods have significant drawbacks. For example, one such problem is the difficulty of substances that form organic molecular crystals to nucleate under high supersaturations, thus often producing amorphous material instead of desired crystals. A second problem is the difficulty to control, design and scale-up such processes resulting in a lack of commercial success. Moreover, undesired polymorphs may be produced in lieu of the desired crystalline compound given high levels of supersaturation. Further, polymorphs of organic molecular crystals are more susceptible to being produced because of the weak forces that hold molecules together in the lattice.

Polymorphism is defined as the ability of substances to crystallize into more than one distinct structure or polymorph. The distinct structures or polymorphs have different properties. These properties include density, shape, vapor pressure, solubility, dissolution rate, bioavailability, and electrical conductivity. Polymorphism is quite common among the elements of the Periodic Table as well as in organic and inorganic species.

When poor mixing is combined with high supersaturation, local zones with high variability of supersaturation are produced. In a batch process this can lead to uncontrolled crystallization with a wide crystal size distribution that is difficult to scale up or reproduce. A uniform supersaturation environment throughout the crystallizer is necessary to achieve desired particle size distributions that remain the same batch to batch in a batch vessel or achieve a steady state in a continuous vessel. Thus, mixing plays an important role in the size of crystals as well as the crystal size distribution, as intense and localized mixing on the micron and smaller scale helps to achieve more uniform supersaturation.

Well known mixing systems have been used to generate rapid mixing of solvent/antisolvent mixtures, and include mechanical stirrers, confined impinging jets, and tee mixers. Conventional chemical reactors make use of mechanical stirrers. Generally, a stirred tank reactor includes a vessel with baffles on the sides, wherein an impeller generates fluidic motion inside the vessel. The baffles prevent the fluid from circulating with the impeller. Confined impinging jets include two equal diameter fluid jet nozzles that collide streams of fluids within a small chamber, which subsequently are discharged though an outlet tube. Drawbacks to impinging jets include maintaining the alignment of the impinging fluid jet steams, difficult scale-up, and problems with clogging. Tee mixer devices include two opposed jets of equal diameter that collide and produce flow in an outlet tube. Similar to the impinging jet technology, tee mixers tend to clog easily. Thus, scale-up continues to be a challenge.

Another example of a mixer is a continuous pipe reactor with a static mixer therein, also referred to as a plug flow reactor. The static mixer is comparable to the impeller of a conventional chemical reactor. Static mixers have been used extensively in fields such as plastics, polymers and oil. Less information is readily known about the implementation of static mixers for producing pharmaceutical compounds. Static mixers consist of a series of elements of alternating clockwise and counterclockwise twist arranged axially within a tube to promote mixing. A key advantage of the static mixer over the impeller is the absence of moving parts. This results in lower maintenance and operating costs. Another advantage of a static mixer in a reactor is the absence of axial mixing. Axial mixing results in a broad residence time distribution. Because a narrow residence time distribution is necessary to produce a narrow particle size distribution, a continuous plug flow regime is preferred.

Crystallization also has long been recognized as an important process in the development of pharmaceutical compounds. In the pharmaceutical industry, over 90% of the active pharmaceutical ingredients (API) are crystals of small organic molecules. The method or process chosen to carry out crystallization directly affects the characteristics of pharmaceutical compounds such as crystal size distribution (CSD), crystal size, desired polymorphic transformation (i.e., crystal shape/habit), and purity. In relation to a crystal's polymorphic transformation tendencies, optimizing the crystallization process is essential to obtain crystals with high product quality and yield. Uniform yield is highly desirably for pharmaceutical companies when assessing their active ingredients for determining scale-up.

With regard to crystal size, it is generally known in the art that smaller crystals dissolve faster than larger crystals. In addition, smaller crystals tend to increase the speed of action and bioavailability of a pharmaceutical drug. Such characteristics are highly desirable for pharmaceutical companies seeking quick release of their active ingredients.

Thus, a need exists for an improved crystallization process and system to produce crystals having a narrow crystal size distribution, small crystal size, and high purity in the pharmaceutical industry. Further, a need exists for crystallization processes that produce consistent crystal size distributions, such that no batch to batch variations arise, or that achieve favorable steady state condition in continuous systems. Furthermore, a need exists for crystallization processes that are ideal for the pharmaceutical industry in view of scale-up considerations. It is to these needs and others that the present invention is directed.

SUMMARY OF THE INVENTION

The present invention is a process for crystallizing high value specialty chemicals and pharmaceuticals using a multistage antisolvent addition approach and optionally cooling to produce narrow crystal size distributions. There is significant interest in low volume continuous technology to crystallize active pharmaceutical ingredients (API) in controlled crystal sizes below 100 microns, and particularly below 50 microns, with a narrow crystal size distribution (CSD).

One aspect of the process and system of the present invention is for controlling and producing narrow CSDs. The preferred CSDs are achieved in a continuous plug flow regime preferably with a single addition point for the feed solution (a mixture of the compound of interest and a solvent) and with multiple addition points (i.e., stages) of antisolvent. Generally, the present invention is a process for crystallizing an organic compound using an antisolvent comprising the following steps:
 a) preparing a feed solution of the organic compound in a solvent;
 b) adding the feed solution to a continuous plug flow system;
 c) adding an antisolvent to the plug flow system at least one addition point;
 d) mixing the feed solution with the antisolvent to produce a slurry of crystals of the organic compound;
 e) optionally decreasing the temperature within or along the plug flow system (cooling the slurry) to further increase the saturation or supersaturation level; and
 f) recovering the crystals of the organic compound from the slurry.

The process for promoting ideal CSDs preferably involves the introduction of an antisolvent at multiple points (i.e., stages). This crystallization technique requires an antisolvent of low solubility mixed with a solvent, such as water, having a higher solubility. The solvent and antisolvent are miscible so they mix and form a solvent mixture in which the solubility is much less than the solute in the original solvent. The principal of antisolvent crystallization is based in solubility change based on changing the composition of the solvent system. The resulting high supersaturation is thereby preferably controlled by employing a continuous plug flow reactor with static mixing. The residence time is controlled within a narrow distribution which then produces a narrow, controlled crystal size distribution. In other words, one way to achieve a narrow particle size distribution is by controlling both the residence time of the particles formed in the reactor and the mixing of the feed solution and the antisolvent. Good mixing of the feed solution and the antisolvent at the molecular level helps to control the local variations in supersaturation.

The system used to carry out the continuous crystallization process generally is comprised of a plurality of continuous plug flow reactors or reactor modules (reactor stages) connected in series. Each plug flow reactor comprises a static mixer in order to reduce or eliminate axial mixing. The slurry comprising a compound of interest in a solution with a solvent and an antisolvent flows sequentially from one continuous plug flow reactor to the next. A series of plug flow reactors (which also can be referred to as crystallizers) increases the flexibility of the process and helps to obtain a narrow CSD. In addition, if necessary or desired, temperature can also be varied, preferably lowered, through a temperature control jacket around the reactors, as cooling the solvent mixture allows additional supersaturation control and increased yield.

In relation to the pharmaceutical industry, controlled, consistent average CSDs are highly preferred. Consistent CSDs promote better quality mixtures when creating solid dosage forms, such as tablets and capsules. The pharmaceutical industry also generally desires smaller crystals of the APIs, as smaller crystals generally require less milling. In practice, milling reduces crystal size, thereby increasing surface area and improving formulation dissolution properties, but adds a process step. Therefore, if the milling process is omitted from the manufacturing process, production costs can be significantly reduced.

These features, and other features and advantages of the present invention, will become more apparent to those of ordinary skill in the relevant art when the following detailed description of the preferred embodiments is read in conjunction with the appended drawings.

DETAILED DESCRIPTION OF PREFERRED EMBODIMENTS

Figure 1:
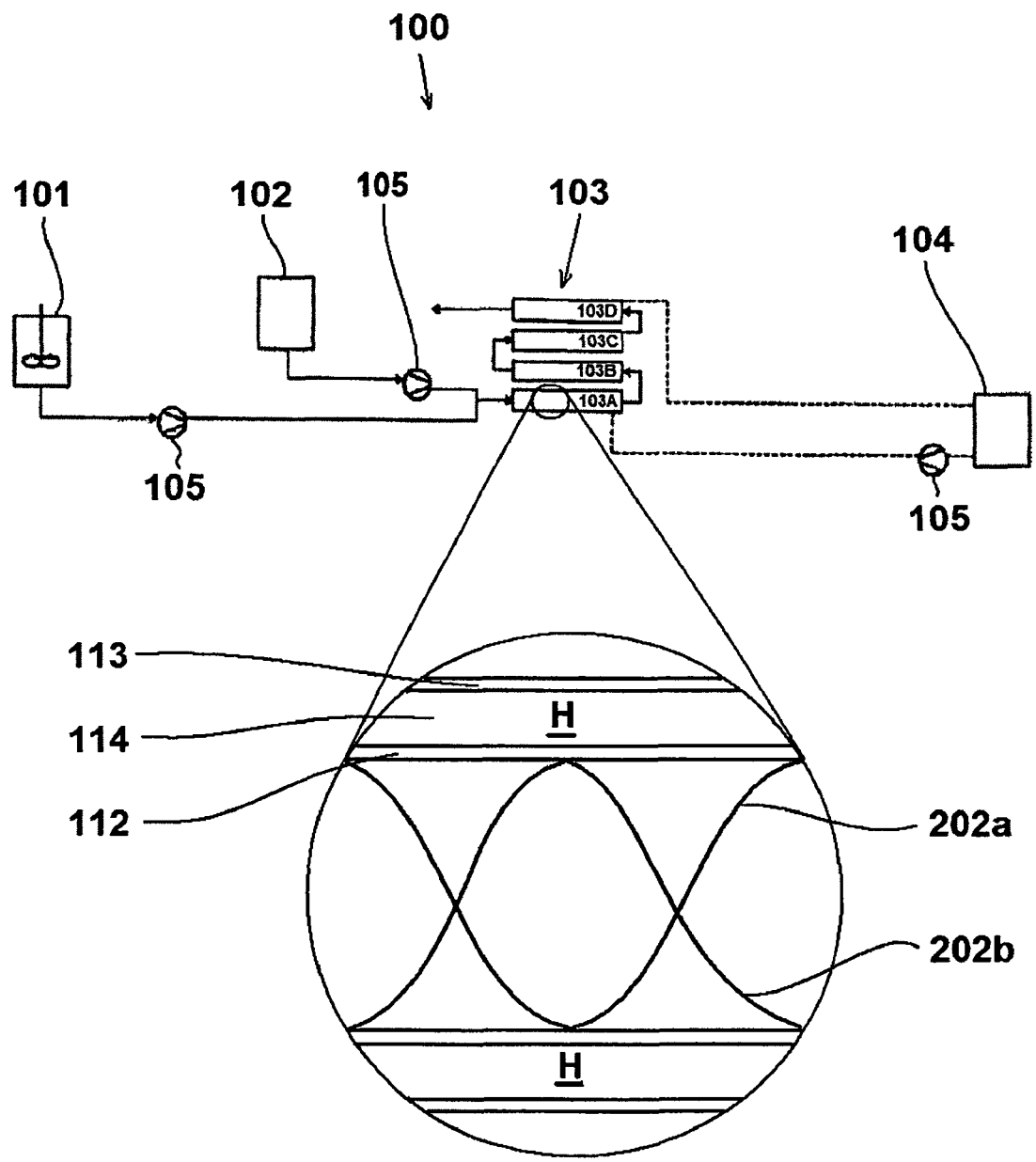
FIG. 1 illustrates a continuous plug flow crystallization system representative of the present invention.

The present invention is a process for crystallizing organic compounds using a multistage antisolvent addition approach and optionally cooling to produce narrow crystal size distributions, preferably in controlled sizes below 100 microns, and particularly below 50 microns, with a narrow crystal size distribution (CSD). The preferred CSDs are achieved in a continuous plug flow regime preferably with a single addition point for the feed solution (a mixture of the compound of interest and a solvent) and with multiple addition points (i.e., stages) of antisolvent.

Generally, the present invention is a process for crystallizing an organic compound using an antisolvent comprising the following steps:
a) preparing a feed solution of the organic compound in a solvent;
b) adding the feed solution to a continuous plug flow system;
c) adding an antisolvent to the plug flow system at least one addition point;
d) mixing the feed solution with the antisolvent to produce a slurry of crystals of the organic compound;
e) optionally decreasing the temperature within or along the plug flow system (cooling the slurry) to further increase the saturation or supersaturation level; and
f) recovering the crystals of the organic compound from the slurry.

A preferred embodiment of the present invention is a process for crystallizing an organic compound using an antisolvent comprising the following steps:
a) preparing a feed solution of the organic compound in a solvent;
b) adding the feed solution to a continuous plug flow system, wherein the plug flow system comprises a plurality of reactor modules arranged in series and the feed solution is added to a first of the reactor modules;
c) adding an antisolvent to the plug flow system at a plurality of addition points corresponding to the plurality of reactor modules, wherein equal amounts of the antisolvent are added at each of the addition points;
d) mixing the feed solution with the antisolvent to produce a slurry of crystals of the organic compound;
e) optionally decreasing the temperature within or along the plug flow system (cooling the slurry) to further increase the saturation or supersaturation level; and
f) recovering the crystals of the organic compound from the slurry exiting the plug flow system.

This preferred crystallization technique of introducing an antisolvent at multiple points (i.e., stages) requires a feed solution of the compound of interest in a solvent having a relatively high solubility relative to the antisolvent, which generally has a low solubility. The resulting high supersaturation of the solvent mixture created upon the mixing of the feed solution and the antisolvent is thereby preferably controlled by employing a continuous plug flow reactor with static mixing and by controlling the residence time within the reactor within a narrow distribution, which then produces a narrow, controlled crystal size distribution. One preferred way to achieve a narrow particle size distribution is by controlling both the residence time of the particles formed in the reactor and the mixing of the feed solution and the antisolvent, and good mixing at the molecular level helps to control the local variations in supersaturation. The use of static mixers within the reactor modules has proven to provide a suitable level of mixing for the present invention.

A preferred system used to carry out the continuous crystallization process generally is comprised of a plurality of continuous plug flow reactors connected in series, each of which comprises a static mixer in order to reduce or eliminate axial mixing. The feed solution, comprising a solution of the compound of interest and a solvent, and the antisolvent are introduced to the first reactor module, in which crystallization initiates of crystals of the compound of interest, and the resulting slurry comprising the feed solution, the antisolvent, and the crystals flows sequentially from one continuous plug flow reactor to the next. Such a series of plug flow reactors increases the flexibility of the process and helps to obtain a narrow CSD. In addition, temperature can be varied, preferably lowered, through a temperature control jacket around the reactors, as cooling the solvent mixture (the mixture of the feed solution and the antisolvent) allows additional supersaturation control and increased yield.

Preferred embodiments of the present invention are related to crystallization methods for producing crystals with a narrow crystal size distribution preferably less than 100 μm, less than 90 μm, less than 80 μm, and even less than 50 μm. Preferred embodiments include a process for multistage addition of an antisolvent to a continuous plug flow system. Embodiments further include a system for carrying out the crystallization process disclosed above.

In the preferred process, a first solution is a feed solution comprising a preferred compound in a suitable solvent or combination of solvents, and a second solution is an antisolvent capable of initiating the preferred compound's precipitation from the first solution. The antisolvent is chosen based on a relatively low solubility of the solute in the antisolvent. The first solution preferably can be unsaturated, undersaturated, or supersaturated. As is known in the crystallization art, the solvent and antisolvent are selected to be miscible so they can mix and form a solvent mixture in which the solubility is much less than the solute in the original solvent.

Compounds of interest preferably include organic compounds and active pharmaceutical ingredients. For example, paracetmol, ibuoprofen, theophylline, carbamazepine, sulfathiazole, itraconazole, and other related compounds are presented as models as these compounds are of great interest to the medical and research communities. The example pharmaceutical compounds chosen are commercially important, have more then one polymorph, and/or will form an amorphous solid under high supersaturation.

Amino acids are also presented as compounds of interest, as (i) amino acids are relatively easy to grow in aqueous and alcohol solutions; (ii) almost all the amino acids have more that one crystal structure (or polymorph); (iii) there is an extensive background and information on the crystallization of each amino acids; and (iv) at high supersaturations, the nanometer and micron sized amino acid crystals are amorphous or semi-crystalline.

Solvents or antisolvents may include organic and inorganic solvents. The solvent, if used, should be compatible with the compound of interest in that the compound of interest must be soluble in the solvent. Further, the compound/solvent solution must be capable of supersaturation. Although the preferred solvent is water, other suitable solvents include, but are not limited to, organic, inorganic, ionic liquids, and supercritical solvents. Once a compound of interest is selected for producing crystals, the appropriate solvent is selected. Those of ordinary skill in the art can determine the appropriate solvent for a selected compound of interest without undue experimentation.

Other preferred solvents include alcohols, ethyl acetate, halogenated solvents, acids, bases, acetonitrile, hexanes, ethers, and water. Suitable illustrative examples of solvents and antisolvents include, but are not limited to, ethanol, methanol, ethyl acetate, methylene chloride, acetonitrile, acetic acid, hexane, ether, and water. Alternatively, the antisolvent can contain a suitable reactant compound that reacts with the compound to be crystallized in the feed solution. Given the compound to be crystallized by a reactant crystallization process, one of ordinary skill in the art also would be able to select suitable reactant compounds to initiate the crystallization process.

The present invention uses the concept of controlling the residence time of the feed solution in the reactors for the optimal growth of crystals. Generally, in preferred embodiments of the present invention, the residence time for growing crystals preferably is on the order of a few minutes to a few days, depending on the growth rate of the compound, and more preferably is between about 5 minutes to about 120 minutes. Residence time is defined as the average time for processing of the feed solution in one reactor volume measured at specified conditions. It is also known as space time denoted by the symbol τ. Residence time is calculated as the volume divided by the volumetric flow rate. Accordingly, if the dimensional volume of a reactor increases, while keeping the volumetric flow rate of the feed solution constant, the residence time of the feed solution in the reactor would increase. Conversely, if the volumetric flow rate were to increase, while keeping the total dimensional volume constant, the residence time would decrease.

In addition, optimal crystal size also depends on the type of flow of the feed solution within the crystallizer. The Reynold's number Re is a dimensionless unit used to identify and predict different flow regimes, such as laminar or turbulent flow, within the crystallizer. Laminar flow occurs at low Reynolds numbers, where viscous forces are dominant. Laminar flow occurs generally at Re<50 and may be characterized as a smooth, constant, fluid motion. On the other hand, turbulent flow is a direct result of a high Reynold's number and primarily dominated by inertial forces. Turbulent flow occurs generally at Re>200 and tends to produce random eddies, vortices and other flow fluctuations.

According to preferred embodiments of the present invention, crystals can be grown within a temperature range of between about −25° C. to 150° C., but preferably are grown within a temperature range of 0° C. to 100° C., and more preferably between about 5° C. and about 40° C. One factor in choosing the temperature for the crystal growth is the temperature at which the compound of interest will precipitate out of the supersaturated solution. Other factors are primarily attributed to the physical and chemical characteristics of the compound of interest. Additionally, the solvent mixture (alternatively referred to as the crystal slurry) can be cooled as it progresses through the stages to provide additional supersaturation. Cooling can be accomplished through the jacket pipe and each stage can be at a lower temperature than the previous stage.

In the present invention, FIG. 1 illustrates a preferred system for obtaining small crystal size distributions. A solution of the first (feed) solution (i.e., an API or organic compound) is initially contained within a storage tank 101, and the second (antisolvent) solution is initially contained within a separate storage tank 102, such as volumetric flasks. The feed solution and the antisolvent are fed into a reactor 103, which preferably is a jacketed reactor comprising an interior core reactor 112 and a surrounding jacket pipe 113, as disclosed in more detail below. As disclosed in more detail below, the feed solution and the antisolvent solution are respectively injected into the first reactor module 103a of the core reactor 112 to initiate the crystallization reaction, and the crystal slurry is removed from the last of the reactor modules 103, in this case the fourth reactor module 103d, for drying and further processing.

The continuous plug flow system 100 comprises a crystallizer (reactor) 103 with multiple reactor modules 103 a-d. Four reactor modules 103 are disclosed in the illustrative embodiment, but it is possible to use more or fewer reactor modules 103. Each reactor 103 comprises a core reactor 112 where crystallization occurs. The illustrative core reactor 112 for proving the concept of this invention is tubular and can carry up to 76 cm³ of solution. This illustrative core reactor 112 is 600 mm long and has an internal diameter of 12.7 mm. The reactor modules 103a-d are set up in series such that the solution and antisolvent flow consecutively through the reactor modules 103a-d. Moreover, reactor modules 103a-d can be added or omitted as necessary in order to obtain the desired crystal size distribution.

A sleeve or jacket pipe 113 preferably surrounds the core reactor 112, which, in the illustrative embodiment, creates a sleeve and tube reactor of concentric tubes, with the reactor core 112 being the inner tube and the jacket pipe being the outer tube. The illustrative jacket pipe 113 is 600 mm long and has an internal diameter of 35 mm. The jacket pipe 113 has a greater diameter than the core reactor 112 so as to leave a annular manifold space 114 between the core reactor 112 and the jacket pipe 113. Heat exchanging fluid H is circulated in the jacket pipe 113, specifically in the annular manifold space 114, in a known manner in order to regulate the temperature inside the core reactor 112.

Glass was chosen as the preferred material for fabricating the core reactor 112 and jacket pipe 113 so that the experiment could be visible for detecting abnormal patterns in the flow. Other materials are suitable and can be selected by those of ordinary skill in the art without undue experimentation based on the desired or necessary heat transfer characteristics of the fabricating materials.

The preferred temperature range for operation of the core reactors 112 is from about −25° C. to about 150° C. The range is controlled with a specificity of ±0.1° C. using a waterbath temperature controller 104 (e.g., a NESLAB RTE Refrigerated Bath/Circulator is suitable for controlling the temperature at which crystallization is carried out). The controller 104 has a processor in order to carry out specific processes such as increasing or decreasing temperature and flow rate for the pumps 105. Preferred pumps 105 are peristaltic pumps (e.g., Masterflex L/S series, variable speed from Cole Parmer) with maximum feed rate of 1700 ml/min. Although FIG. 1 displays three pumps 105, one of ordinary skill may increase or decrease the number of pumps in order to obtain the desired flow rate.

Figure 2:
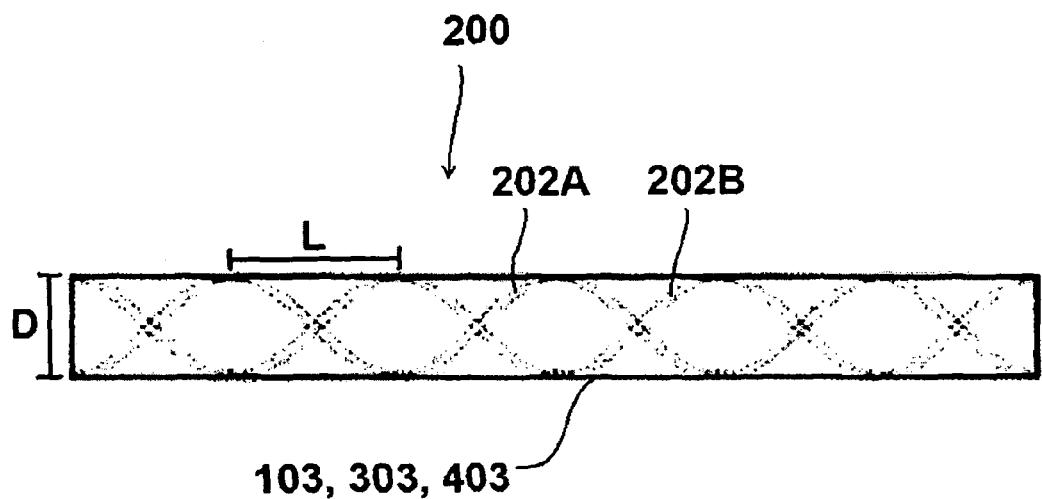
FIG. 2 illustrates a static mixer that is placed in a reactor module suitable for use in the present invention.

FIG. 2 illustrates a suitable static mixer 200 that operates within or forms a part of the crystallization reactor 103 (e.g., a Kenics brand static mixer). Generally, a static mixer is a stationary obstacle placed in a tubular reactor in order to promote mixing and can be seen as the equivalent of the stirrer in a stirred tank reactor. It has the advantage that it has no moving parts and it extracts the energy required for mixing from the flow in the form of an increase in pressure drop. Furthermore, the maintenance cost and operating cost of static mixers are lower than conventional stirrers and a static mixer requires less space.

Static mixers consist of a series of elements 202 of alternating clockwise 202a and counterclockwise 202b twist arranged axially within a tube (i.e., core reactor 112) to promote mixing. Static mixers cause feed solutions to approach plug flow when the number of mixing elements is increased. Operation of the present invention in a plug flow system is desirable because it leads to a narrow particle size distribution. The basic principle of these static mixers is to split, stretch and recombine the fluid in order to achieve mixing. In particular, the preferred static mixer includes a series of mixing elements, each consisting of a short helical length of approximately 1.5 times the tube's diameter. The helices have clockwise and counterclockwise rotations at an angle of 180°. The two converging helixes are placed at an angle of 90° with respect to each other.

At higher Reynolds numbers, the static mixer is comparable to a rotating plate that suddenly changes its rotation direction. At the suction side of the mixing element vortices appear, which are similar to vortices that appear when a plate is rotated. Furthermore, due to the sudden change in flow direction at the junction of two mixing elements, a large vortical structure appears at the center of the mixing element. These vortical structures play a significant role in the mixing efficiency. Residence time distribution can be evaluated under different flow conditions by means of tracer particles to determine if a desired level of mixing is being achieved.

Figure 3:
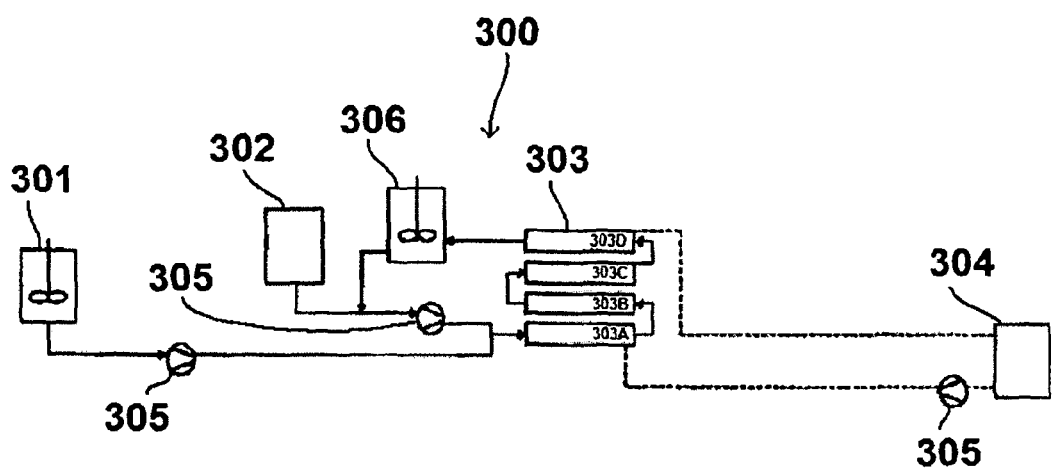
FIG. 3 illustrates a preferred embodiment of the continuous plug flow crystallization system of the present invention incorporating a recirculation path.

FIG. 3 illustrates a continuous plug flow system 300 as a second preferred embodiment. In addition to the elements of system 100, system 300 further encompasses a process for recirculation of the crystal slurry by way of a retention flask 306. The solution comprising the compound of interest is initially held in a flask 301 with an agitator. The antisolvent also is held in a flask 302. Pump 305 pumps the solution and antisolvent into the first plug flow reactor module 303a, where crystallization initiates. The slurry from the first plug flow reactor module 303a flows into and through the second plug flow reactor module 303b, the third plug flow reactor module 303c, and the fourth plug flow reactor module 303d. Plug flow reactor modules can be added or removed from the system 300 as necessary. The flow from the exit end of the fourth plug flow reactor module 303d is directed to a retention flask 306 or some other suitable holding vessel. The retention flask 306 comprises a magnetic stirrer to ensure that the slurry remains in a preferred state of suspension. The slurry from the retention flask 306 is pumped back into the first plug flow reactor module 303a. Waterbath temperature controller 304 regulates the temperature of the reactor 303. In view of the preferred embodiment of the continuous plug flow system 300, residence time was increased relative to system 100.

Figure 4:
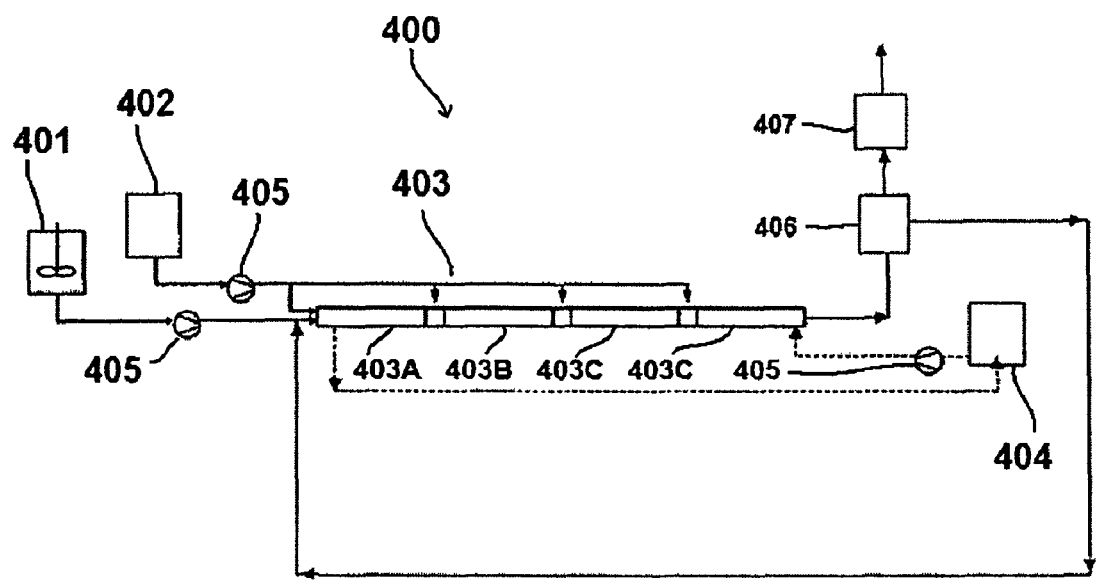
FIG. 4 illustrates a second preferred embodiment of the continuous plug flow crystallization system of the present invention with multistage antisolvent addition.

FIG. 4 illustrates a third preferred embodiment of the continuous crystallization system 400. In particular, the crystallizer 403 comprises four reactor modules 403a-d. Each reaction module is a continuous plug-flow crystallizer implementing a static mixer. Waterbath temperature controller 404 regulates the temperature of the reactor 403. The slurry from the final reactor module 403d is received by a filter 407 in order to recover crystals. In this embodiment, antisolvent from flask 402 is preferably added in multiple points or stages. In systems 100, 300 the antisolvent is added together with the feed solution to the entrance of the first reactor module 103a, 303a. In system 400, a portion of the antisolvent is added at the beginning of each of the reactor modules 403a-d.

Thus, as shown in FIG. 4, the feed solution from flask 401 is introduced into the first reactor module 403a along with a portion of the antisolvent. Additional portions of the antisolvent also are introduced into each subsequent reactor module 403b-d as designated by an arrows. Thus, the antisolvent is added in discrete fractions to each reactor module 403a-d. As provided in the exemplary embodiments, system 400 may comprise up to four or more antisolvent addition points. More specifically, the process can be optimized to increase or decrease the number of antisolvent addition points in the system. Alternatively, reactor 403 may be a single unitary structure having a plurality of addition points, preferably equally spaced along the length of the reactor 403.

The total volume of antisolvent introduced into the reactor modules 403a-d preferably remains constant relative to systems 100, 300. For example, in systems 100, 300, if the initial antisolvent volume was 100 ml, all 100 ml would be added along with the feed solution to the first reactor module 103a, 303a during the antisolvent addition process. Similarly, if system 400 had but a single reactor 403, all 100 ml of the antisolvent would be added along with the feed solution to the single reactor 403 during the antisolvent addition process. However, if system 400 has two reactor modules 403a-b, then the process and system would be configured to add the antisolvent equally in two points, 50 ml of the antisolvent would be added at the first point, which is at the entrance of the first reactor module 403a along with the entire volume of the feed solution, and 50 ml of the antisolvent would be added at the second point, which is at the entrance of the second reactor module 403b. If system 400 has three reactor modules 403a-c, then the process and system would be configured to add the antisolvent equally in three points, 33.3 ml of the antisolvent would be added at the first point, which is at the entrance of the first reactor module 403a along with the entire volume of the feed solution, 33.3 ml of the antisolvent would be added at the second point, which is at the entrance of the second reactor module 403b, and 33.3 ml of the antisolvent would be added at the third point, which is at the entrance of the third reactor module 403c. If system 400 has the preferred four reactor modules 403a-d, then the process and system would be configured to add the antisolvent equally in four points, 25 ml of the antisolvent would be added at the first point, which is at the entrance of the first reactor module 403a along with the entire volume of the feed solution, 25 ml of the antisolvent would be added at the second point, which is at the entrance of the second reactor module 403b, 25 ml of the antisolvent would be added at the third point, which is at the entrance of the third reactor module 403c, and 25 ml of the antisolvent would be added at the fourth point, which is at the entrance of the fourth reactor module 403d. And so forth if additional reactors modules 403e-infinity are added.

Reactor 303, 403 also preferably are jacketed reactors as disclosed above in connection with reactor 103. As such, reactor 303, 403 preferably comprise a core reactor and a jacket pipe for allowing temperature control of the reactor and specifically the core reactor. Alternative methods and devices for controlling the temperature of the reactor and specifically the core reactor also are within the scope of this invention.

Upon exiting the last reactor module 103d, 303d, 403d (or whichever reactor module is last), the slurry containing the crystals of the compound of interest is sent to a filter 407 (not shown in FIGS. 1 and 3 relative to reactor 103, 303, but also can be present) to separate the crystals from the remaining solvent and antisolvent, and any other liquids. The type, size and CSD of the crystals can be measured and it can be determined whether the crystals are acceptable and suitable for the desired use. If the crystals and/or CSD are not acceptable, the reaction parameters can be adjusted. For example, the degree of supersaturation, the solvent, the antisolvent, the ratio of solvent to compound, the ration of antisolvent to solvent, the reaction temperature, and the residence times all can be adjusted individually or in any suitable combination.

Prior to being sent to the filter 407 or a filter, the crystal slurry can be contained within a retention flask 406 or the equivalent (not shown in FIGS. 1 and 3 relative to reactor 103, 303, but also can be present) for storage. Stirring is preferable in the retention flask 406, such as by a magnetic stirrer or the equivalent. Alternatively or additionally, a surfactant can be added to the system to stabilize the CSD if one desires to keep the crystal solids as a slurry for further processing.

Various analytical devices can be used to measure the type, size, and CSD of crystals produced. For example, an ultraviolet spectrophotometer (e.g., model GENESYS 20 from Thermo Spectronic with a wavelength range of about 325 to 1100 nm or a UV cell Fisher Scientific 14-385-918A 3 ml capacity) or an infrared spectrophotometer (e.g., model IdentifyIR from Smiths Detection Technology with a wavelength from about 4000 to 650 cm$^{-1}$) can be utilized for measuring the concentration of compounds, depending on the compounds. The CSD of the solid product can be characterized with laser diffraction (e.g., Microtrac Standard Range Analyzer model SRA 150 from Leeds & Northrup, with measurement range from about 0.7 to 704 μm) or with focused beam reflectance measurement (FBRM) (e.g., Lasentec S400 probe from Mettler Toledo, with a measurement range from about 785 nm to 100 μm), also depending on the compounds. The probe based FBRM technique allows for in situ particle analysis. The number of chord lengths (the product of the reflection time and the beam velocity) is measured during a time interval to yield a chord length distribution. The laser light diffraction instrument is able to produce a number distribution, area distribution, and volume distribution of the sample. The laser diffraction instrument assumes the measured crystals are spheres in order to calculate the CSD from the measured diffraction pattern.

Raman Spectroscopy can be employed to identify the polymorphic form of the crystals obtained in the plug flow experiments (e.g., Raman Rxn1 System from Kaiser Optical System, Inc. with a range from about 200 to 3200 cm$^{-1}$ is an illustrative device that can be utilized for characterizing the crystals). Crystal morphology can be observed in an optical microscope (e.g., model Nikon Eclipse ME 600 from Nikon Co with a differential interference contrast (DIC) polarizer and magnification range from about 5× to 150×).

EXAMPLES

The following examples discuss CSDs for APIs, organic compounds, and chemicals in antisolvent addition systems using a continuous plug flow regime. These examples are illustrative in nature to show proof of concept and are neither limiting nor the only uses for the invention.

1. Ketoconazole (an API)

A saturated solution of ketoconazole (an anti-fungal drug) was prepared with about 39 grams of the pharmaceutical compound and about 470 ml of methanol as the solvent in a 1000 ml volumetric flask. The solution was maintained at about 35° C. (10° C. above the saturation temperature) for about 2 hours under gentle agitation to ensure complete dissolution of the solids. The solution was cooled down and maintained at room temperature (i.e., 25° C.) overnight (approximately 8 hours).

The ketoconazole feed solution (ketoconazole and methanol) and the antisolvent (water) were added to the reactor 403 at a constant flow rate using peristaltic pumps 405. The total amount of antisolvent added to the reactor 403 was enough to maintain a solution/antisolvent ratio of about 70:30 vol/vol (ml/ml) in all of the experiments.

The effect of residence time in the reactor (the term residence time is used to denote the total cumulative residence time in all of the reactor modules combined) and number of stages (that is, the number of reactor modules) on crystal size distribution was studied. The results are recorded in Table 1.

TABLE 1

| Experiment | # Stages | Residence time (min) |
|---|---|---|
| 1 | 1 | 9 |
| 2 | 1 | 15 |
| 3 | 1 | 21 |
| 4 | 1 | 28 |

TABLE 1-continued

| Experiment | # Stages | Residence time (min) |
|---|---|---|
| 5 | 2 | 10 |
| 6 | 2 | 20 |
| 7 | 2 | 30 |
| 8 | 2 | 40 |
| 9 | 2 | 50 |
| 10 | 2 | 60 |
| 11 | 2 | 70 |
| 12 | 2 | 80 |
| 13 | 3 | 10 |
| 14 | 3 | 20 |
| 15 | 3 | 30 |
| 16 | 3 | 40 |
| 17 | 3 | 50 |
| 18 | 3 | 60 |
| 19 | 3 | 70 |
| 20 | 3 | 80 |

As shown in Table 1, twenty experiments were conducted using one to three reactor modules and one to three points for antisolvent addition, respectively. That is, for experiments with one reactor, there was one antisolvent addition point, for experiments with two reactors, there were two antisolvent addition points, and for experiments with three reactors, there were three antisolvent addition points. Antisolvent addition was added in equal proportions in relation to the number of stages allotted. That is, for experiments with one reactor, all of the antisolvent was added at the one antisolvent addition point (at the entrance to the single reactor module), for experiments with two reactors, one-half of the antisolvent was added at each of the two antisolvent addition points (at the entrances to each of the two reactor modules), and for experiments with three reactors, one-third of the antisolvent was added at each of the three antisolvent addition points (at the entrances to each of the three reactor modules). Results for one-stage antisolvent addition exhibited a residence time ranging from about 9 to 28 min. Results for two-stage antisolvent addition exhibited a residence time ranging from about 10 to 80 min. Results for three-stage antisolvent addition also exhibited a residence time ranging from about 10-80 min.

The effects of residence time and number of stages on the CSD were analyzed. The CSD analysis comprised of withdrawing a first sample of about 5 ml of the flowing slurry from the retention flask 406. Next, the sample was filtered with a 0.22 μm syringe filter 407 (e.g., a Millipore Millex Sterile Syringe Filter) in order to separate liquid from solid crystals of the solid ketoconazole compound. The solid ketoconazole was diluted 40 times in methanol. Further, the diluted ketoconazole solid in methanol was measured with a UV spectrophotometer (e.g., a GENESYS 20 UV spectrophotometer) in order to determine the concentration of the ketoconazole.

In addition, a second sample of about 5 ml of the flowing slurry comprising ketoconazole crystals was filtered with a 0.45 μm membrane (e.g., a Whatman membrane filter). The membrane was place in a funnel, preferably a Buchner funnel, under vacuum. The solid phase product was dried overnight (approximately 8 hours) at about 65° C. A Raman spectra analysis of the product crystals was used to assess polymorphic form.

The CSD of ketoconazole was measured at different residence times and number of stages as illustrated in Table 1 using laser diffraction. Dried ketoconazole crystals were slurried in water and introduced into a laser diffraction device for analysis (e.g., the Mictrotrac device disclosed above). Each of the 20 samples was scanned three times. Each scan lasted approximately 90 sec. The average crystal size distribution of the three scans was determinative of the CSD.

Figure 5:
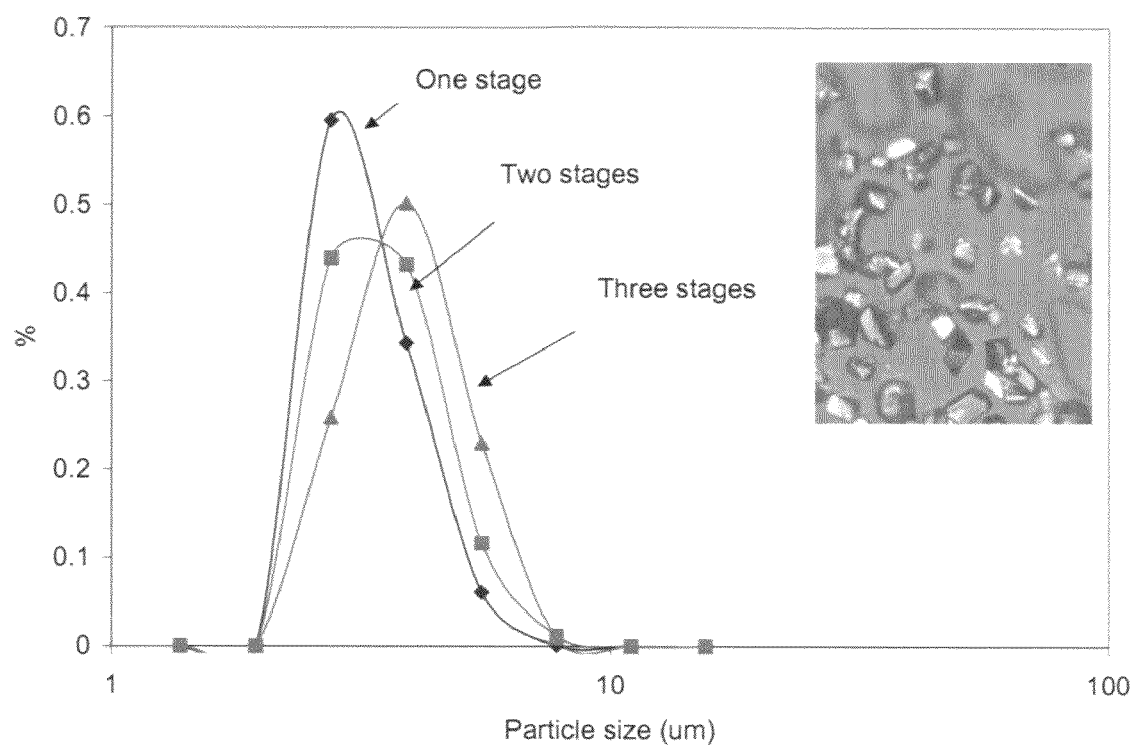
FIG. 5 illustrates an experimental crystal size distribution curve for an exemplary pharmaceutical compound (ketoconazole) for three reactor stages of antisolvent addition, with the insert being a photomicrograph of FIG. 5 illustrating the crystal size distribution for the exemplary pharmaceutical compound (ketoconazole).
Figure 5A:
FIG. 5A is an enlargement of the photomicrograph of FIG. 5 illustrating the crystal size distribution for an exemplary pharmaceutical compound (ketoconazole).

High supersaturation values of the feed solution promoted the formation of small crystals as nucleation becomes the dominant process at these conditions. FIG. 5 displays a narrow CSD obtained with one, two, and three stages/points of antisolvent addition. The inset within FIG. 5 showing an actual microscopic picture of the CSD is better illustrated in the larger image provided in FIG. 5A. This narrow CSD can be attributed to good mixing at a molecular level (i.e., micromixing) as well as by the constant residence time distribution obtained in a plug flow regime of the present continuous plug flow system.

From FIG. 5, the mean crystal size at the first stage of antisolvent addition is about 2.5 μm. The residence time at the first stage is about 40 min. The mean crystal size at the second stage of antisolvent addition is between about 3.0 and 3.5 μm. The residence time at the second stage is about 50 min. The mean crystal size at the third stage of antisolvent addition is between about 3.0 and 3.5 μm. The residence time at the third stage is about 80 min.

Figure 6:
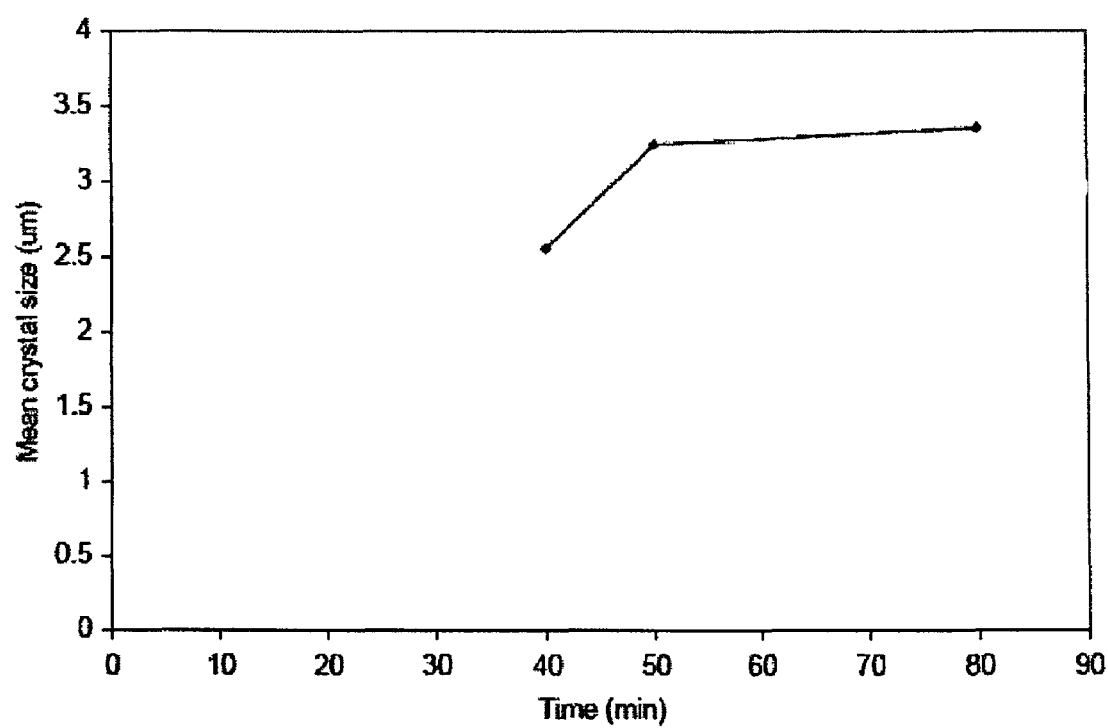
FIG. 6 illustrates an experimental mean crystal size curve for an exemplary pharmaceutical composition (ketoconazole) in three reactor stages.

The effect of residence time on mean crystal size is presented in FIG. 6 for crystallization of ketoconazole with one point of addition of antisolvent. As expected, mean particle size increases with residence time. However, the final particle size is relatively small, which illustrates that nucleation of small particles is achieved when the process is carried out at high supersaturation levels.

Figure 7:
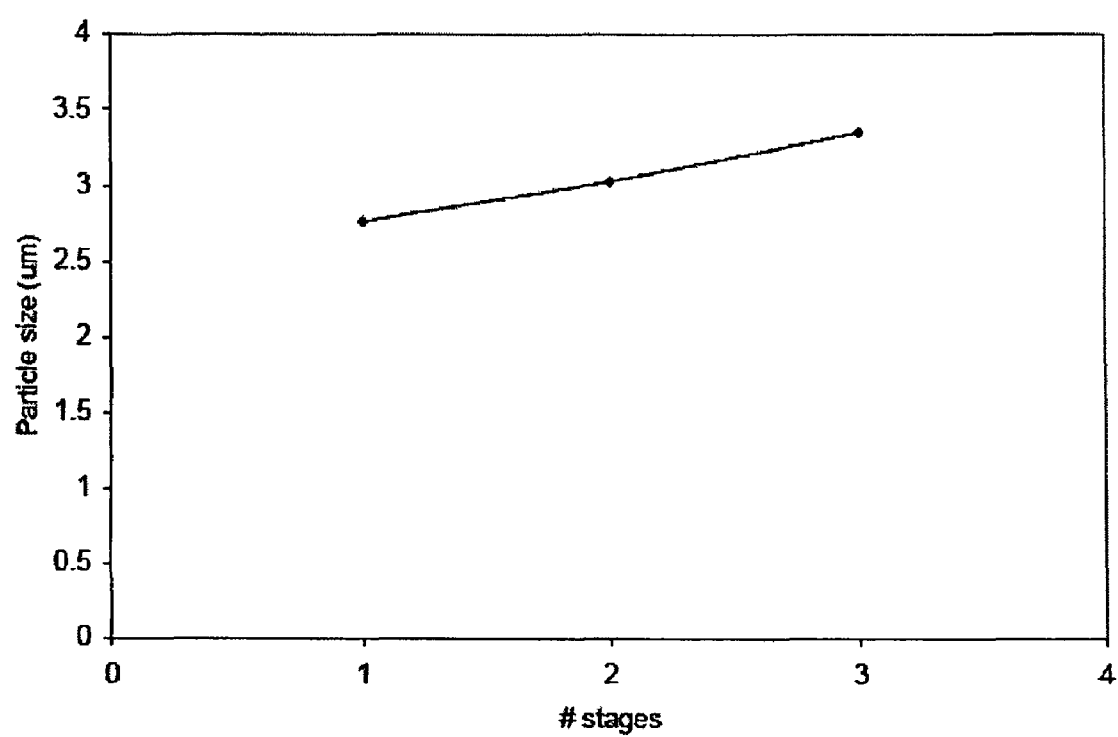
FIG. 7 illustrates an experimental mean crystal size for an exemplary pharmaceutical composition (ketoconazole) crystallized in each of reactor stages 1, 2 and 3.

The effect of the number of antisolvent addition points (i.e., stages or reactor stages or reactor modules) on the mean crystal size is presented in FIG. 7. Mean crystal size is provided for three stages. From the illustrated graph, mean crystal size increases with the number of stages. The results indicate that as the initial supersaturation decreases with the number of stages, the ratio of crystal growth rate to nucleation rate favors crystal growth. Similar to the results for FIG. 5, the mean crystal size for one point of antisolvent addition is about 2.5 to 3.0 μm, the mean crystal size for two points of antisolvent addition is about 3.0 μm, and the mean crystal size for three points of antisolvent addition is about 3.0 to 3.5 μm. As discussed earlier, the total volume of antisolvent addition remains the same for one, two or three points of antisolvent addition.

2. Glycine Amino Acid (an Organic Compound)

A saturated solution of glycine (a simple amino acid) was prepared with about 150 g of the glycine amino acid and about 600 ml of water (the solvent) in a 1000 ml volumetric flask. The solution was maintained at about 35° C., which is 10° C. above the saturation temperature, for at least 2 hours under gentle agitation for complete dissolution of solids. The solution was cooled down and maintained at room temperature (i.e., 25° C.) overnight (approximately 8 hours).

Glycine solution and an antisolvent, such as methanol, were respectively added to the reactor 403 at a constant flow rate using peristaltic pumps 405. The concentration of antisolvent introduced to the reactor 403 was suitable to maintain a solution/antisolvent ratio of about 80:20 vol/vol (ml/ml) in all of the experiments.

Table 2 illustrates the process conditions for the experiment with glycine. Three experiments were conducted with one point of antisolvent addition (one stage or one reactor module). The residence time for experiments 1, 2 and 3 were 0.5 to 2 min, respectively.

TABLE 2

| Experiment | # Stages | Residence time (min) |
|---|---|---|
| 1 | 1 | 0.5 |
| 2 | 1 | 1 |
| 3 | 1 | 2 |

A sample of about 5 ml of the flowing slurry was drawn at the end of the crystallization process, that is, upon exiting the reactor 403. The slurry was filtered with a 0.22 μm syringe filter (e.g., a Millipore Millex sterile syringe filter).

In addition, a second sample of about 5 ml of the flowing slurry was filtered with a 0.45 μm membrane filter (e.g., a Whatman membrane filter) using a Buchner funnel. The process was performed under vacuum. The solid phase was dried overnight (approximately 8 hours) at about 65° C. Raman spectra of the product crystals were collected to ascertain the polymorphic form. It was observed that the α-glycine crystals were obtained at low residence time, whereas β-glycine crystals were obtained as the residence time increased.

Figure 8:
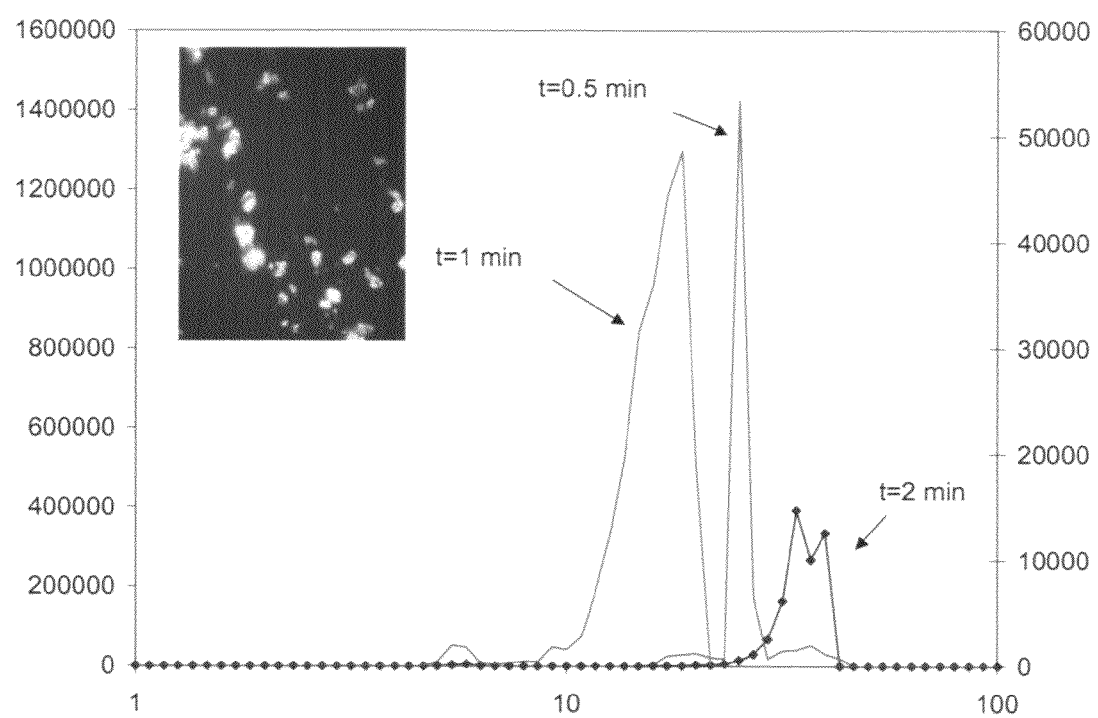
FIG. 8 illustrates an experimental crystal size distribution for an exemplary organic composition (glycine) as a function of residence time, with the insert being a photomicrograph of the exemplary organic compound (glycine) crystals.
Figure 8A:
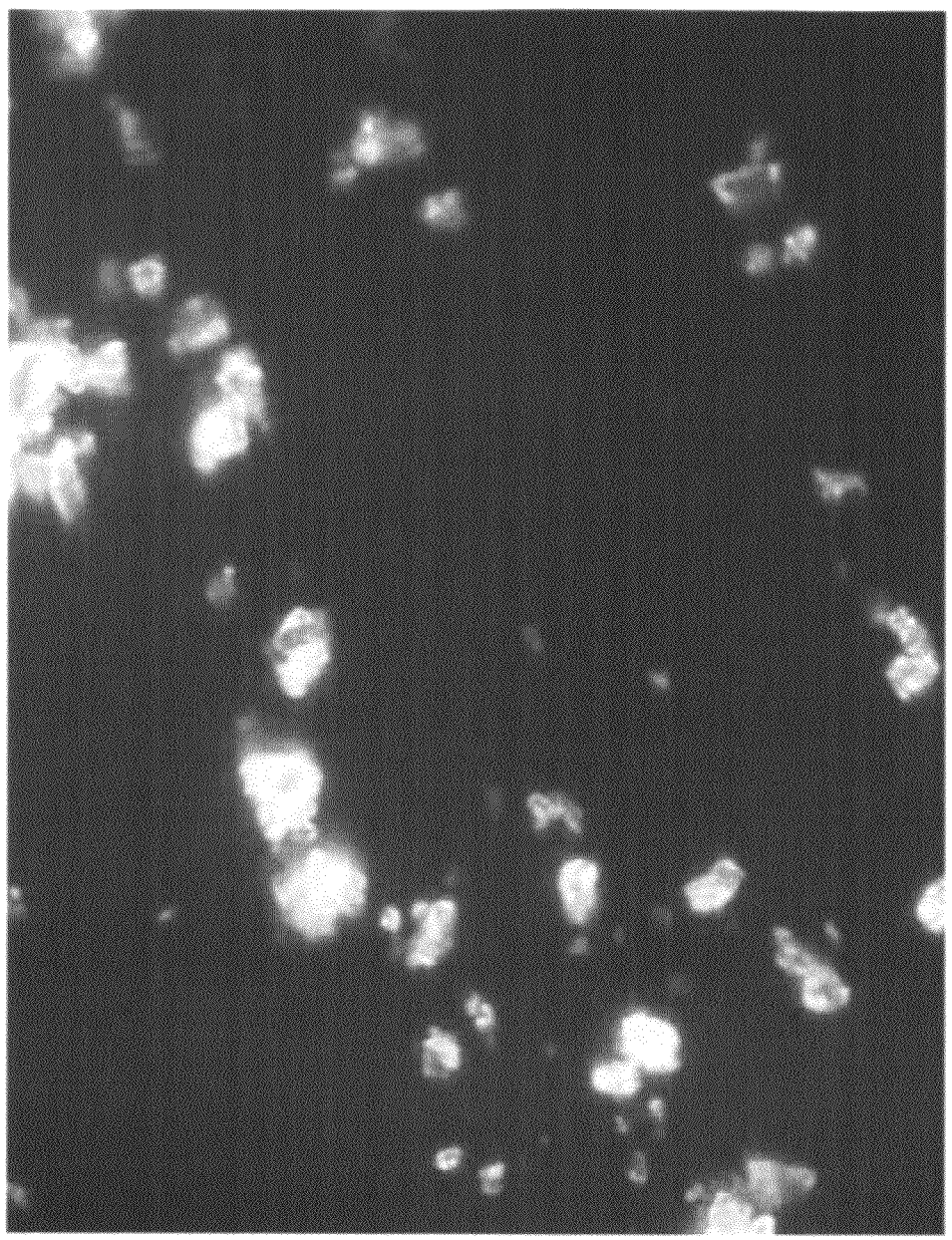
FIG. 8A is an enlargement for the photomicrograph of FIG. 8 of the exemplary organic compound (glycine) crystals.

In addition, the dried crystals were slurried in water and introduced into a laser diffraction device (e.g., the Mictrotrac device disclosed above). Each sample of the three experiments was scanned three times for 90 sec. The average of the results is the CSD. FIG. 8 illustrates the experimental crystal size distribution for glycine as a function of residence time, with the insert being a photomicrograph of the glycine crystals.

3. Flufenamic Acid (an API)

An undersaturated solution of flufenamic acid (a non-steroidal anti-inflammatory drug) was prepared with 8.7 grams of the active pharmaceutical drug and 700 ml of ethanol (the solvent) in a 1000 ml volumetric flask. The solution was stirred at room temperature (i.e., 25° C.) until complete dissolution.

Flufenamic acid solution and water (the antisolvent) were added to the reactor at constant flow rates using peristaltic pumps. The flow rate of antisolvent added to reactor was chosen in order to maintain a solution/antisolvent ratio of 1:2 vol/vol (ml/ml) in all experiments.

TABLE 3

| | Experiment | | | |
|---|---|---|---|---|
| | 1 | 2 | 3 | 4 |
| Flufenamic Acid flow rate (ml/min) | 100 | 100 | 100 | 100 |
| Number of antisolvent addition points | 1 | 2 | 3 | 4 |
| Module where antisolvent is added | 1 | 1, 2 | 1, 2, 3 | 1, 2, 3, 4 |
| Antisolvent flow rate added in Module 1 (ml/min) | 200 | 100 | 67 | 50 |
| Antisolvent Flow rate added in Module 2 (ml/min) | — | 100 | 67 | 50 |
| Antisolvent Flow rate added in Module 3 (ml/min) | — | — | 67 | 50 |
| Antisolvent Flow rate added in Module 4 (ml/min) | — | — | — | 50 |

The effects regarding number of addition points of antisolvent on particle size distribution were studied and are summarized in Table 3. In sum, four experiments were conducted. For each experiment, the total antisolvent flow rate was 200 ml/min. In Experiment 1, there was one antisolvent addition point with 200 ml/min of solvent added therein. In Experiment 2, there were two antisolvent addition points with 100 ml/min of antisolvent added to the first and second reactor modules, respectively. In Experiment 3, there were three antisolvent addition points with 67 ml/min of antisolvent added to the first, second and third reactor modules, respectively. In Experiment 4, there were four antisolvent addition points with 50 ml/min of antisolvent added to the first, second, third and fourth reactor modules, respectively.

A sample of about 5 ml of the flowing slurry was drawn at the end of the process, filtered with a 0.22 um syringe filter, and the concentration of flufenamic acid was measured in an IR spectrophotometer. From the IR spectrophotometer, the peak of 1410 cm$^{-1}$ was selected to prepare a calibration curve (not shown).

Also, a sample of the flowing slurry was filtered with a 0.45 um membrane (e.g., a Whatman Membrane Filter) on a Buchner funnel under vacuum and the solid phase was dried overnight (approximately 8 hours) at room temperature (i.e., 25° C.). The Raman spectra of the product crystals was collected to ascertain polymorphic form. The CSD of the solid product was also characterized using a particle analyzer probe (e.g., a Lasentec brand probe). The dried crystals were slurried in water and 0.5% of sodium dodecyl sulfate (SDS) surfactant was added to disperse the particles. A magnetic stirrer was used to keep the particles suspended during particle analysis measurements.

Figure 9:
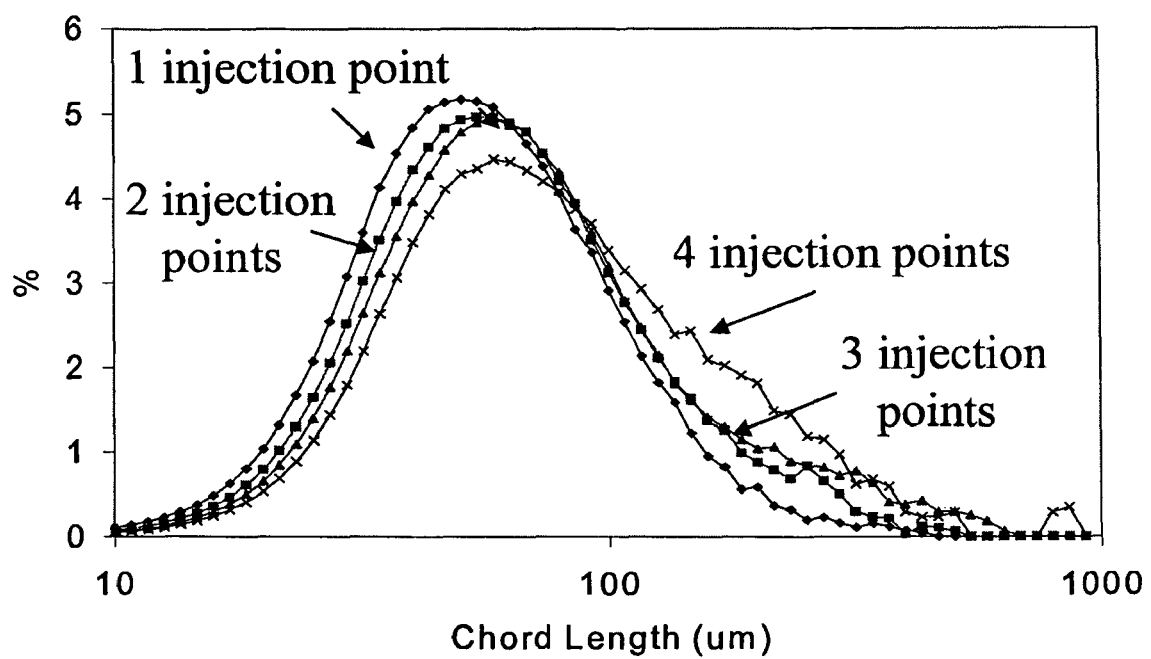
FIG. 9 illustrates the particle size for an exemplary pharmaceutical composition (flufenamic acid) as a function of the number of points of addition of antisolvent.

The effects in relation to the number of addition points of antisolvent on CSD are presented in FIG. 9. As illustrated herein, at one addition point of antisolvent, a relatively large number of small particles are formed because of an initially high supersaturation. For two addition points, the initial supersaturation is lower than at one addition point, resulting in the formation of fewer particles; however, the resultant particle size is bigger. For three and four addition points, a similar mechanism occurs, wherein the initial supersaturation is reduced and particle size increases.

Figure 10:
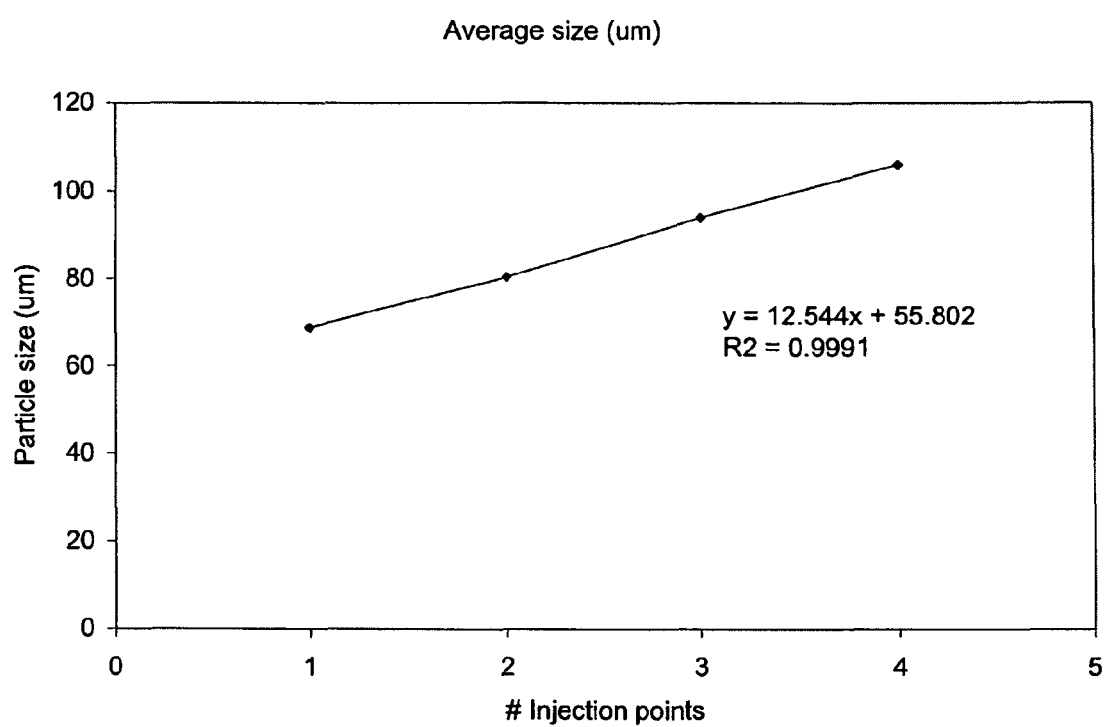
FIG. 10 illustrates the mean particle size obtained for an exemplary pharmaceutical composition (flufenamic acid) as a function of the number of addition points of antisolvent.

FIG. 10 illustrates a linearly proportional relationship between increase in mean crystal size and number of addition points of antisolvent. The relationship suggests that the ratio of crystal growth rate to nucleation rate is dominated by the growth mechanism, resulting in a steady increase in crystal size. As shown in FIG. 10, the first addition point of antisolvent resulted in the mean crystal size being between approximately 65-70 μm. At the second addition point, the mean crystal size was approximately 80 μm. At the third addition point, the mean crystal size was approximately 95 μm. At the third addition point, the mean crystal size was approximately 110 μm.

4. Glutamic Acid (an Organic Compound)

A saturated solution of glutamic acid (an amino acid) was prepared with 16 grams of the amino acid and 1848 ml of water (the solvent) in a 2 L beaker. The solution was maintained at 35° C. (10° C. above the saturation temperature) for 2 hours under gentle agitation to ensure complete dissolution of the solids. The solution was cooled down and maintained at room temperature (i.e., 25° C.) overnight (approximately 8 hours).

Glutamic acid solution and acetone (the antisolvent) were added to the reactor at a constant flow rate using peristaltic pumps. The flow rate of antisolvent added to the reactor was chosen in order to maintain a solution/antisolvent ratio of 1:5 vol/vol (ml/ml) in all experiments.

The effects regarding number of addition points of antisolvent on particle size distribution were studied and are summarized in Table 4. In sum, four experiments were conducted. For each experiment, the total antisolvent flow rate was 150 ml/min. In Experiment 1, there was one antisolvent addition point with 150 ml/min of solvent added therein. In Experiment 2, there were two antisolvent addition points with 75 ml/min of antisolvent added to the first and second reactor modules, respectively. In Experiment 3, there were three antisolvent addition points with 50 ml/min of antisolvent added to the first, second and third reactor modules, respectively. In Experiment 4, there were four antisolvent addition points with 37.5 ml/min of antisolvent added to the first, second, third and fourth reactor modules, respectively.

TABLE 4

|  | Experiment | | | |
| --- | --- | --- | --- | --- |
|  | 1 | 2 | 3 | 4 |
| Glutamic Acid flow rate (ml/min) | 30 | 30 | 30 | 30 |
| Number of antisolvent addition points | 1 | 2 | 3 | 4 |
| Module where antisolvent is added | 1 | 1, 2 | 1, 2, 3 | 1, 2, 3, 4 |
| Antisolvent flow rate added in Module 1 (ml/min) | 150 | 75 | 50 | 37.5 |
| Antisolvent Flow rate added in Module 2 (ml/min) | — | 75 | 50 | 37.5 |
| Antisolvent Flow rate added in Module 3 (ml/min) | — | — | 50 | 37.5 |
| Antisolvent Flow rate added in Module 4 (ml/min) | — | — | — | 37.5 |

A sample of approximately 5 ml of the flowing slurry was drawn at the end of the process, filtered with a 0.22 um syringe filter (e.g., a Millipore Millex Sterile Syringe Filter), and the concentration of glutamic acid was measured with HPLC. Previously, a calibration curve was prepared using a set of solutions of known glutamic acid concentration. The peak of 210 nm was selected to prepare a calibration curve (not shown).

Also, a sample of the flowing slurry was filtered with a 0.45 um membrane (e.g., a Whatman Membrane Filter) on a Buchner funnel under vacuum and the solid phase was dried overnight (approximately 8 hours) at room temperature (i.e., 25° C.). Raman spectra analysis of the product crystals was collected to ascertain polymorphic form. Crystal size distribution of the solid product was also characterized using a particle analysis probe (e.g., a Lasentec brand probe). The dried crystals were slurried in acetoner and a magnetic stirrer was used to keep the particles suspended during particle analysis measurements.

Figure 11:
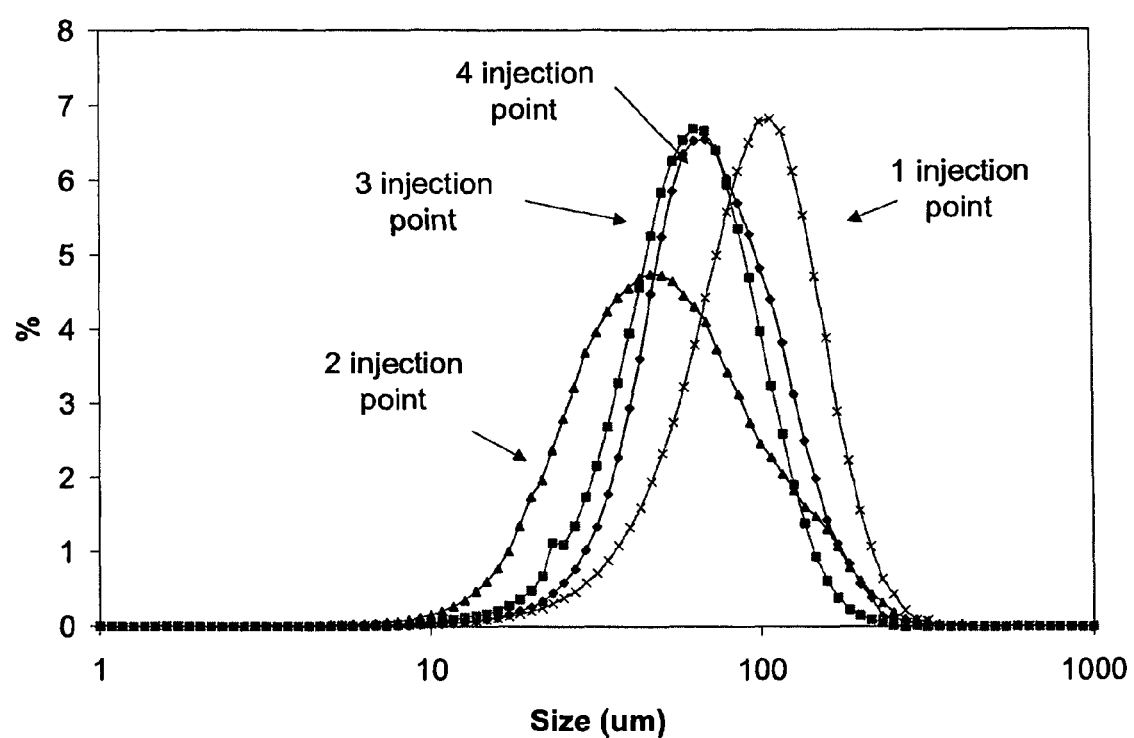
FIG. 11 illustrates particle size (volume based) for an exemplary organic compound (glutamic acid) as a function of the number of points of addition of antisolvent.

The effect of number of addition points of antisolvent in view of the crystal size distribution for glutamic acid is presented in FIG. 11. Counterintuitive of the general results provided for flufenamic acid in FIG. 10 above, the results for glutamic acid illustrate an initial decrease in crystal size from one antisolvent addition point to two antisolvent addition points. Thereafter, crystal size increased from two antisolvent addition points to three antisolvent addition points to four antisolvent addition points.

Figure 12:
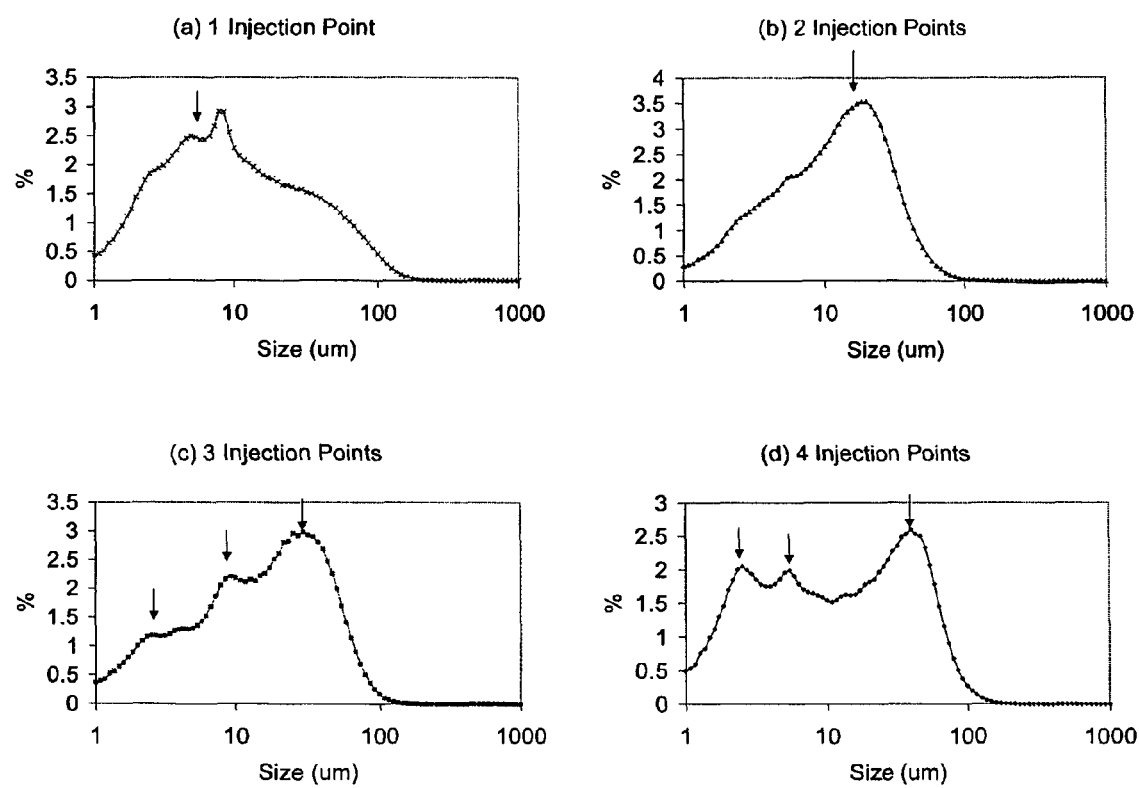
FIG. 12 illustrates particle size (number based) for an exemplary organic compound (glutamic acid) as a function of the number of points of addition of antisolvent.

The behavior is better understood upon viewing the crystal size distributions shown in FIGS. 12A-D. In particular, FIG. 12A illustrates one point of antisolvent addition resulting in a broad crystal size distribution. Notably, the maximum crystal size distribution point is clearly located in a smaller size range than for two, three, and four antisolvent addition points. Thus, the broad crystal size distribution of FIG. 12A shifts the mean crystal size higher. High supersaturation values is a motivating factor for producing broader crystal size distributions. In this experiment, broader crystal size distributions were indicative of higher numbers of uncontrolled crystals, thus producing more polymorphs.

FIG. 12B illustrates that addition of antisolvent in two points. The initial supersaturation level is lower with two antisolvent addition points in contrast to one antisolvent addition point. This results in a narrower crystal size distribution.

FIG. 12C portrays an interesting behavior. Three different peaks (three populations) are clearly identifiable. The peak located in the smaller crystal size distribution can be associated with crystals nucleated in the third antisolvent addition point, wherein the peak located at the intermediate crystal size distribution can be associated with crystals nucleated in the second antisolvent addition point. Moreover, the largest peak, located at the greatest particle size distribution, can be attributed to crystals nucleated before the first addition point. These crystals had longer residence times in the reactor, thus resulting in larger crystal sizes. Further, the experiments produced larger crystal sizes within the third and fourth modules of the reactor accordingly.

FIG. 12D illustrates similar characteristics to FIG. 12C in view of their 3 peaks, respectively. The distinction in FIG. 12D concerns the first two peaks. With four antisolvent addition points, the first two peaks illustrate a narrow crystal size distribution. Moreover, these first two peaks are closer to one another, defining the crystal size distribution in the second through fourth antisolvent addition points. The first point of antisolvent addition is clearly the third peak in FIG. 12D.

As can be seen from this disclosure, a continuous multi-stage plug flow crystallization process for the preparation of fine crystals of controlled size and crystal size distribution is disclosed. However, the present invention is not limited to the order of the steps described if such order or sequence does not alter the functionality of the present invention. That is, it is recognized that some steps may be performed before or after other steps without departing from the scope and spirit of the present invention. Further, certain steps can be eliminated and other steps added without departing from the scope and spirit of the present invention.

As such, the above detailed description of the preferred embodiments, including the example methods and products, and the appended figures are for illustrative purposes only and are not intended to limit the scope and spirit of the invention, and its equivalents, as defined by the appended claims. One skilled in the art will recognize that many variations and modifications can be made to the invention disclosed in this specification without departing from the scope and spirit of the invention.

What is claimed is:

1. A process for crystallizing an organic compound using an antisolvent comprising:
   a) preparing a feed solution of the organic compound and a solvent;
   b) adding a mixture of the feed solution and the solvent to a continuous plug flow system having at least one process module;
   c) adding an antisolvent to the plug flow system at least one addition point;
   d) mixing the mixture with the antisolvent in order to produce a slurry; and
   e) recovering crystals from the slurry.

2. The process according to claim 1, wherein at least a portion of the slurry is cooled while within the plug flow system.

3. The process according to claim 1, further comprising the step of decreasing the temperature within or along the plug flow system to further increase the saturation or supersaturation level.

4. The process according to claim 1, wherein the antisolvent is added to the continuous plug flow system in at least one addition point such that the total volumetric flow rate of antisolvent during crystallization remains fixed.

5. The process according to claim 1, wherein a residence time for crystallization ranges from about 5 to 120 min.

6. The process according to claim 4, wherein a crystal size distribution of the recovered crystals is inversely proportional to the number of antisolvent addition points.

7. The process according to claim 4, wherein a mean crystal size of the recovered crystals is directly proportional to the number of antisolvent addition points.

8. The process according to claim 6, wherein the mean crystal size is less than 100 μm.

9. The process according to claim 6 wherein the mean crystal size is less than 50 μm.

10. The process according to claim 1, wherein the mixing step is carried out at a temperature of between about 0° C. and about 100° C.

11. The process according to claim 1, wherein the mixing step is carried out at a temperature of between about 5° C. and about 40° C.

12. The process according to claim 1, wherein residence time within reactors in the plug flow system is between about 5 minutes and about 5 days.

13. The process according to claim 1, wherein residence time within reactors in the plug flow system is between about 5 minutes and about 120 minutes.

14. The process according to claim 4, wherein the number of antisolvent addition points is less than or equal to 4.

15. The process according to claim 1, wherein a surfactant is added to the feed solution, to the antisolvent, or to both the feed solution and to the antisolvent.

16. A process for crystallizing an organic compound using an antisolvent comprising the following steps:
   a) preparing a feed solution of the organic compound in a solvent;
   b) adding the feed solution to a continuous plug flow system, wherein the plug flow system comprises a plurality of reactor modules arranged in series and the feed solution is added to a first of the reactor modules;
   c) adding an antisolvent to the plug flow system at a plurality of addition points corresponding to the plurality of reactor modules, wherein equal amounts of the antisolvent are added at each of the addition points;
   d) mixing the feed solution with the antisolvent to produce a slurry of crystals of the organic compound;
   e) adjusting the temperature of the plug flow system to maximize crystallization of the organic compound; and
   f) recovering the crystals of the organic compound from the slurry exiting the plug flow system.

17. The process according to claim 16, wherein at least a portion of the slurry is cooled while within the plug flow system.

18. The process according to claim 16, further comprising the step of decreasing the temperature within or along the plug flow system to further increase the saturation or supersaturation level.

19. The process according to claim 16, wherein a residence time for crystallization ranges from about 5 to 120 min.

20. The process according to claim 16, wherein a crystal size distribution of the recovered crystals is inversely proportional to the number of antisolvent addition points.

21. The process according to claim 16, wherein a mean crystal size of the recovered crystals is directly proportional to the number of antisolvent addition points.

22. The process according to claim 20, wherein the mean crystal size is less than 100 μm.

23. The process according to claim 20, wherein the mean crystal size is less than 50 μm.

24. The process according to claim 16, wherein the mixing step is carried out at a temperature of between about 0° C. and about 100° C.

25. The process according to claim 16, wherein the mixing step is carried out at a temperature of between about 5° C. and about 40° C.

26. The process according to claim 16, wherein residence time within reactors in the plug flow system is between about 5 minutes and about 120 minutes.

27. The process according to claim 20, wherein the number of antisolvent addition points is less than or equal to 4.

28. The process according to claim 16, wherein a surfactant is added to the feed solution, to the antisolvent, or to both the feed solution and to the antisolvent.

29. A system for producing controlling a narrow crystal size distribution comprising:
   a) a continuous plug flow reactor with at least one process module in which a feed solution comprising an organic compound and a solvent and an antisolvent are mixed;
   b) an addition point for each of the at least one process modules for adding a controlled amount of an antisolvent to each of the at least one process modules; and
   d) a temperature controller used to control the temperature at which crystallization is carried out in the system.

30. The system according to claim 29, wherein the at least one process module comprises a static mixer for continuous mixing of the feed solution and the antisolvent.

* * * * *